(12) United States Patent
Paske et al.

(10) Patent No.: US 9,989,354 B2
(45) Date of Patent: Jun. 5, 2018

(54) CONVEYING APPARATUS

(71) Applicant: SICK AG, Waldkirch (DE)

(72) Inventors: Ralf Paske, Waldkirch (DE); Klemens Wehrle, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days. days.

(21) Appl. No.: 15/666,615

(22) Filed: Aug. 2, 2017

(65) Prior Publication Data

US 2018/0038679 A1 Feb. 8, 2018

(30) Foreign Application Priority Data

Aug. 4, 2016 (DE) .................. 10 2016 114 477

(51) Int. Cl.
| | |
|---|---|
| *G01B 11/04* | (2006.01) |
| *B65G 23/44* | (2006.01) |
| *B65G 15/28* | (2006.01) |

(52) U.S. Cl.
CPC ............ *G01B 11/043* (2013.01); *B65G 15/28* (2013.01); *B65G 23/44* (2013.01); *B65G 2203/0291* (2013.01); *B65G 2203/044* (2013.01); *B65G 2812/02168* (2013.01)

(58) Field of Classification Search
CPC ....... G01B 11/00; G01B 11/04; G01B 11/046; G06K 9/2054; G06K 9/3241; G06K 7/0095; G06K 7/10821; G06K 7/10; B65G 15/28; B65G 23/44; B65G 2203/044; G65G 2203/0291

See application file for complete search history.

(56) References Cited

U.S. PATENT DOCUMENTS

| | | | |
|---|---|---|---|
| 4,750,621 A | 6/1988 | Akesson et al. | |
| 4,773,029 A * | 9/1988 | Claesson | G01B 11/00 250/359.1 |
| 5,331,118 A | 7/1994 | Jensen | |

(Continued)

FOREIGN PATENT DOCUMENTS

| | | |
|---|---|---|
| EP | 0743504 A2 | 11/1996 |
| EP | 2884310 B1 | 6/2015 |

OTHER PUBLICATIONS

German Office Action dated Apr. 4, 2017 in corresponding German Patent Application No. 102016114477.0.

*Primary Examiner* — Sang Nguyen
(74) *Attorney, Agent, or Firm* — Nath, Goldberg & Meyer; Jerald L. Meyer; Stanley N. Protigal (57) ABSTRACT

A conveying apparatus for transporting and for measuring an object includes a sensor having a light transmitter arranged at a conveyor belt and transmits first light beams in the direction of the conveyor belt. The sensor also has a light receiver that is arranged at the conveyor belt and that receives second light beams. The sensor further has an evaluation device for determining a dimension of the object by evaluating the received second light beams. The conveyor belt is an endless conveyor belt that is driven by at least one drive unit and that moves in a main conveying direction. At least one gap is provided in the endless conveyor belt free of interruption, through which gap the first light beams pass, and the first light beams form a scan plane in the at least one gap transversely to the main conveying direction of the conveyor belt.

8 Claims, 4 Drawing Sheets

(56) References Cited

U.S. PATENT DOCUMENTS

| | | | | |
|---|---|---|---|---|
| 5,699,161 | A * | 12/1997 | Woodworth | G01B 11/00 356/628 |
| 6,102,291 | A * | 8/2000 | Mazzone | G01B 11/046 235/462.01 |
| 7,602,505 | B2 * | 10/2009 | Kaltenbach | G01B 11/00 250/559.05 |
| 8,164,750 | B2 * | 4/2012 | Shimazu | B07C 5/3425 209/580 |
| 2004/0144934 | A1 * | 7/2004 | Wehrle | G01B 11/04 250/559.19 |
| 2006/0067579 | A1 * | 3/2006 | Pirkl | G01B 11/24 382/190 |
| 2006/0151604 | A1 * | 7/2006 | Zhu | G06K 7/14 235/454 |
| 2009/0134221 | A1 * | 5/2009 | Zhu | A47F 9/046 235/383 |
| 2014/0036135 | A1 * | 2/2014 | Gehring | H04N 5/23212 348/345 |
| 2014/0319218 | A1 * | 10/2014 | Harbison | G06K 7/0095 235/438 |
| 2015/0036876 | A1 * | 2/2015 | Marrion | G06K 9/2054 382/103 |

\* cited by examiner

CONVEYING APPARATUS

BACKGROUND

The invention relates to a conveying apparatus for transporting and for measuring an object, the conveying apparatus comprising a sensor having a light transmitter that is arranged at a conveyor belt and that transmits first light beams in the direction of the conveyor belt, and having a light receiver that is arranged at the conveyor belt and that receives second light beams, and having an evaluation device for determining a dimension of the object by evaluating the received second light beams.

In the sector of the conveying and logistics industry, a continuous material flow is necessary at some points, with objects transported on a flat conveyor belt in a main conveying direction being detected at said material flow and optionally being measured with respect to their dimensions. This object is achieved as a rule by a volume measurement system for volume measurement by means of scanners, light barriers, light sensors or light grids as sensors.

Current volume measurement systems measure objects having a parallelepiped shape and/or having practically any desired shape on the conveyor belt. The volume measurement system contactlessly determines the real volume of the object as well as the length, width and height of the smallest encasing parallelepiped. In this respect at least one sensor is installed above the conveyor belt that scans the surface of the transported objects and provides the data to its interfaces for further processing.

The sensor transmits light beams in the direction of the conveyor belt and detects light beams reflected from the surface of the object when the light transmitter and the light receiver of the sensor are arranged on the same side of the conveyor belt or light beams not blocked by the object when the light transmitter and the light receiver of the sensor are arranged on oppositely disposed sides of the conveyor belt. In this context, the side of the conveyor belt on which the object lies is understood as the upper side of the conveyor belt and the oppositely disposed side of the conveyor belt is understood as the lower side of the conveyor belt.

The light beams of the sensor are not only reflected from the surface of the object, but also from the surface of the conveyor belt so that the conveyor belt effects interference noise in the measured signal of the sensor. This interference noise of the conveyor belt has the disadvantage that a measured signal of a very flat object on the conveyor belt is covered by the sensor in this so-called noise band. The height of the object can thereby not be detected or measured with sufficient accuracy.

For this reason, with the known volume measurement systems, a required detection line, the so-called trigger level, is set for the sensor so that only measured signals above the noise band of the sensor are taken into account for determining the height of the object. In other words, only objects having a minimum height can be detected and measured.

If an object has rising or falling body edges, the portions of the body, for example a width and/or a length, that are below the required detection line cannot be correctly detected An incorrect measured signal of the dimension of the object thereby results.

To avoid this disadvantage, a conveying apparatus for transporting and for measuring an object is known from EP 2 884 310 B1 in which two conveyor belts are arranged at one another with a marginal spacing. The sensor is arranged above and between the two conveyor belts so that a conveyed object can be measured at the point of the transition between the two conveyor belts.

It results from the arrangement of the conveying apparatus that a slip results between the movement of the conveyor belts and the movement of the object on the transition of the object from one conveyor belt to the other conveyor belt so that the measurement of the object is incorrect.

SUMMARY

It is therefore an object of the invention to improve a conveying apparatus of the initially named kind such that an exact measurement of the object is ensured.

This object is satisfied in accordance with the invention by a conveying apparatus having the features of claim 1.

In this respect, the conveying apparatus for transporting and for measuring an object comprises a sensor having a light transmitter that is arranged at a conveyor belt and that transmits first light beams in the direction of the conveyor belt and having a light receiver that is arranged at the conveyor belt and that receives second light beams, and comprises an evaluation device for determining a dimension of the object by evaluating the received second light beams, wherein the conveyor belt is an endless conveyor belt that is driven by at least one drive unit and that moves in a main conveying direction, and wherein at least one gap is provided in the endless conveyor belt free of interruption, through which gap the first light beams pass, and wherein the first light beams forms a scan plane in this at least one gap transversely to the main conveying direction of the conveyor belt.

The advantage results through the arrangement in accordance with the invention of the endless conveyor belt that the object can be transported free of slip and an exact measurement of the object, in particular of objects having a very small height, can be carried out without interference noise.

In accordance with a preferred embodiment, the sensor comprises a laser scanner, a light barrier comprising the light transmitter and the light receiver or a light grid pair.

In accordance with a further preferred embodiment, at least one deflection device is provided that deflects the endless conveyor belt free from interruption out of its main conveying direction such that the at least one gap is formed transversely to the main conveying direction of the conveyor belt. The deflection device advantageously enables a simple provision of the at least one gap so that no interference noise due to the conveyor belt is present in the scan region.

The deflection device advantageously comprises at least three deflection rollers that are arranged in the form of a triangle with respect to one another and with one side of the triangle in parallel with the main conveying direction of the conveyor belt. A first roller and a second roller are in particular arranged opposite one another and forming the gap between one another and a third roller is arranged, with respect to the first and second rollers, beneath the gap and beneath the first and second rollers.

In accordance with a further preferred embodiment, the first and second rollers are arranged at a lower side of the conveyor belt and the third roller is arranged at an oppositely disposed upper side of the conveyor belt.

The third roller of the deflection device furthermore serves as a reference remission for the sensor in accordance with a further preferred embodiment. A calibration of the sensor of the conveying apparatus in accordance with the invention can hereby be achieved without additional components so that the costs of the conveying apparatus can be kept low even though additional functions are present. Reference marks, in particular reflection marks, are advantageously provided at the third roller that can be read by the sensor for a calibration of the conveying apparatus, for a teaching of parameters, for a determining of a speed and/or for a direction of rotation of the conveyor belt and the like.

In accordance with a further preferred embodiment, a light-permeable conveyor element is arranged in the at least one gap between the deflected conveyor belt. The advantage thereby results that the slip-free transport of the object over the at least one gap is mechanically supported and stabilized so that an even more exact measurement of the object could be achieved. The conveyor belt is advantageously designed such that it collects contaminants from the conveyor belt and disposes of them transversely to the main conveying direction of the conveyor belt. The conveyor element can in particular have the form of a rain gutter so that the contaminants can be collected simply and reliably from the conveyor belt. In this respect, compressed air that is directed along a longitudinal axis of the conveyor element can in a preferred manner provide the disposal or the transporting away of the contaminants from the conveyor element in a very simple manner.

The deflection device is advantageously provided for tensioning the conveyor belt. This means that the deflection device not only serves to deflect the conveyor belt free of interruption so that the gap can be provided in the scan region, but also to hold the conveyor belt under tension so that the object can be transported at a predefined speed and without slip and can be measured.

In accordance with a further preferred embodiment, a hollow space is in this respect present between the gap and the third roller and is bounded by the conveyor belt. A reflector of a light barrier comprising the light transmitter and the light receiver or the light receiver or the light transmitter of a light grid pair is advantageously arranged in the hollow space. A space-saving arrangement of the sensor at the conveyor belt of the conveying apparatus in accordance with the invention is thereby possible.

In accordance with a preferred embodiment, the endless conveyor belt comprises a plurality of bands having a predefined spacing between the bands and the predefined spacing between the bands defines the gaps through which the first light beams pass. The deflection device of the previous embodiment can hereby be saved, whereby the conveying apparatus becomes simpler from a design aspect and costs can be lowered by reducing the parts.

The evaluation device advantageously evaluates the second light beams at positions of the gaps between the bands and the second light beams at positions of the bands while taking account of the results of the second light beams at the positions of the gaps.

Preferred embodiments and further developments as well as further advantages of the invention can be seen from the dependent claims, from the following description and from the drawings.

The invention will be explained in detail in the following with reference to embodiments and to the drawing. There are shown in the drawing:

DETAILED DESCRIPTION

Figure 1:
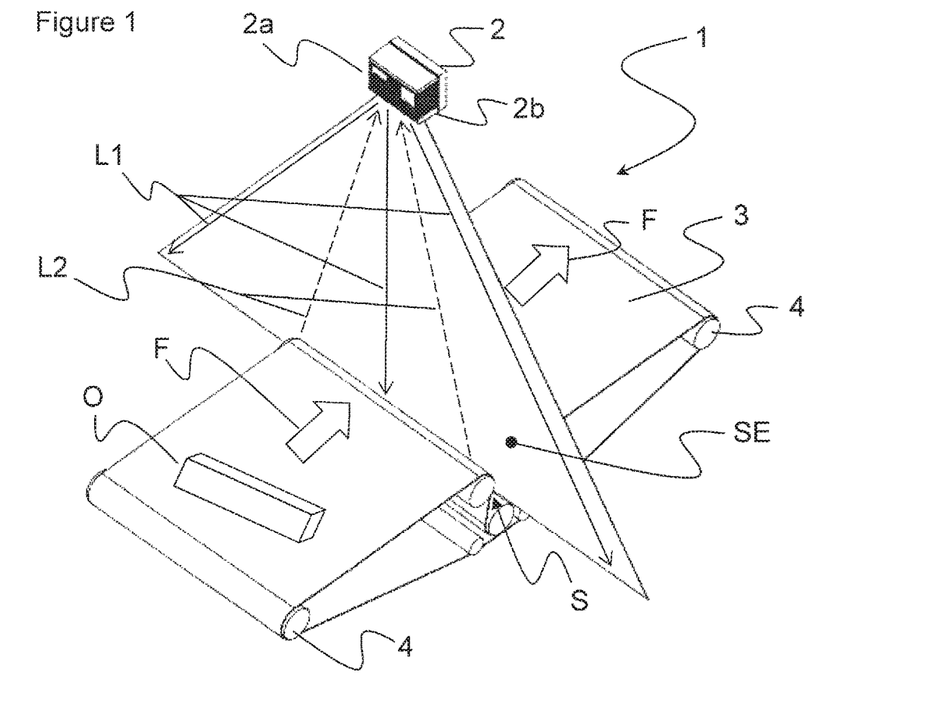
FIG. 1 a schematic 3D representation of a first preferred embodiment of a conveying apparatus in accordance with the invention.

A schematic 3D representation of a first preferred embodiment of the conveying apparatus 1 in accordance with the invention is shown in FIG. 1.

The conveying apparatus 1 in accordance with the invention comprises a sensor 2 that is arranged at a conveyor belt 3. The sensor 2 is in particular arranged in a vertical direction with respect to the conveyor belt 3.

The conveyor belt 3 conveys an object O along a main conveying direction F so that the object O is transported past the sensor 2 to be measured by the sensor 2.

The sensor 2 has a light transmitter 2a and a light receiver 2b. In this respect, the sensor 2 advantageously comprises a laser scanner, a light barrier comprising the light transmitter 2a and the light receiver 2b or a light grid pair.

The light transmitter 2a of the sensor 2 transmits first light beams L1 in the direction of the conveyor belt 3 so that the first light beams L1 form a scan plane SE above the conveyor belt 3. The object O is transmitted through the scan plane SE of the sensor 2 by means of the conveyor belt 3. In this respect, some of the first light beams L1 are reflected from the object O, in particular from its outlines, in the form of two light beams 2 so that the second light beams L2 are detected by the light receiver 2b of the transmitter 2.

The sensor 2 determines data with respect to the shape of the object O from the second light beams L2 and transmits these data to an evaluation device, not shown, of the conveying apparatus 1 in accordance with the invention. The evaluation device determines a dimension, in particular a height, a length and/or a width of the object O, exactly and without error from the data. Objects O that only stand out from the surface of the conveyor belt 3 by a very small height are in particular measured exactly and without interference.

For this purpose, the conveyor belt 3 of the conveying apparatus 1 in accordance with the invention is an endless conveyor belt 3 that is driven by at least one drive unit 4 and moves in the main conveying direction F, with at least one gap S being provided in accordance with the invention in the endless conveyor belt 3 free of interruption, through which gap the first beams L1 of the sensor 2 pass. In other words, the scan plane SC of the sensor 2 is spanned exactly in the at least one gap S. The gap 3 is arranged transversely to the main conveying direction F of the conveyor belt 3. The gap S preferably has a width of one to a plurality of millimeters that is sufficient or a passage of the first beams L1 and/or of the second beams L2.

The first light beams L1 of the sensor 2 are hereby not reflected or scattered by the conveyor belt 3 so that interference noise is avoided on the measurement of the dimension of the object O. The continuous movement of the object O by means of the endless conveyor belt 3 free of interruption in accordance with the invention additionally effects a slip-free measurement of the object O so that the dimension of the object O is determined precisely and exactly.

Figure 2:
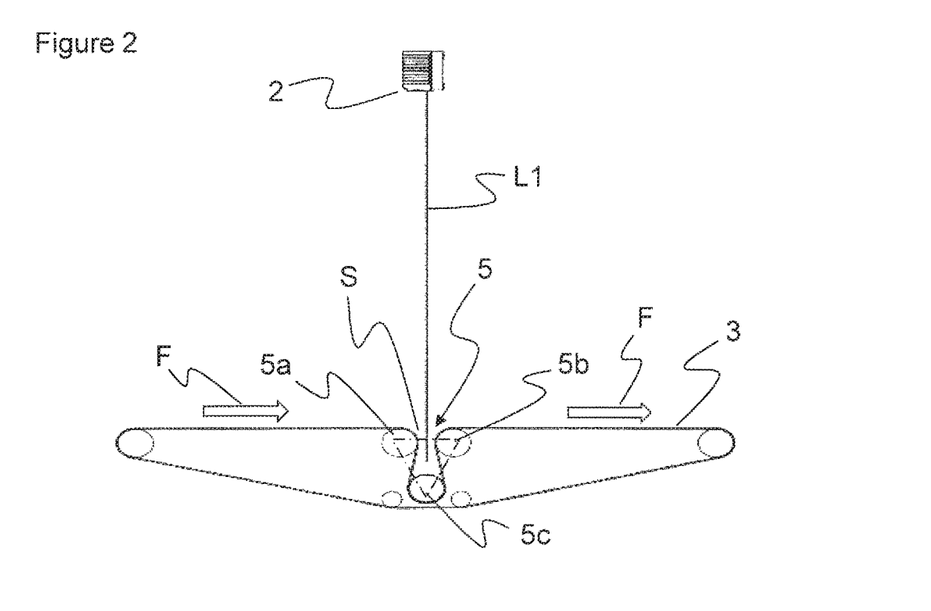
FIG. 2 a schematic side view of the first preferred embodiment of the conveying apparatus in accordance with the invention.

In accordance with the first preferred embodiment of the conveying apparatus 1 in accordance with the invention and shown in FIG. 2, at least one deflection device 5 is provided that defects the endless conveyor belt 3 in accordance with the invention free of interruption from its main conveying direction F such that the at least one gap S is formed transversely to the main conveying direction F of the conveyor belt 3.

In the schematic side view of the first preferred embodiment of the conveying apparatus 1 in accordance with the invention in FIG. 2, the deflection device 5 comprises at least three deflection rollers 5a, 5b and 5c that are arranged in the form of a triangle with respect to one another and with one side of the triangular in parallel with the main conveying direction F of the conveyor belt 3. The triangle is shown schematically with dashed lines in FIG. 2. In this respect, a first roller and a second roller 5a and 5b are arrange disposed opposite one another, whereby the gap S is formed between these two rollers. A third roller 5c is arranged centrally, with respect to the first and second rollers 5a and 5b, beneath the gap S and beneath the first and second rollers 5a and 5b. In this respect, the first and second rollers 5a and 5b are arranged on a lower side of the conveyor belt 3 and the third roller 5c is arranged on an oppositely disposed upper side of the conveyor belt 3.

The sensor 2 is directly arranged above the at least one gap S so that the first light beams L1 enter into the gap S. Interference noise by the conveyor belt 3 is hereby avoided.

The deflection device 5 furthermore serves for tensioning the conveyor belt 3 so that additional tensioning elements can be dispensed with. The slip-free transport of the object O is hereby improved.

Figure 3:
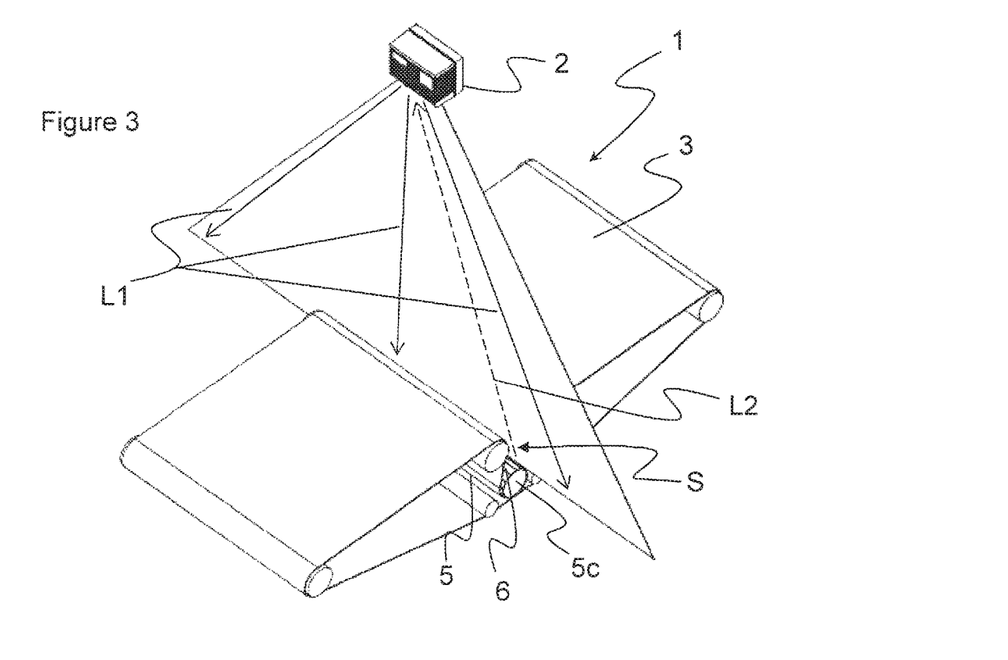
FIG. 3 a further schematic 3D representation of the first preferred embodiment of the conveying apparatus in accordance with the invention.

The third roller 5c of the deflection device 5 advantageously serves as a reference remission for the sensor 2. As shown schematically in FIG. 3, the third roller 5c has reference marks 6, in particular reflection marks, that can be read by the sensor 2 for a calibration of the conveying apparatus 1 in accordance with the invention, for a teaching of parameters, for a determination of a speed and/or of a direction of rotation of the conveyor belt 3 in accordance with the invention and the like. The first light beams L1 pass without interference by light scattering through the at least one gap s and are especially reflected at the reference marks 6 of the third rollers 5c. The second light beams L2 reflected at the reference marks 6 are detected and evaluated by the sensor 2. The evaluation delivers data for the calibration of the conveying apparatus 1 in accordance with the invention or with respect to the speed and/or the direction of rotation of the conveyor belt 3 in accordance with the invention and the like.

Figure 4:
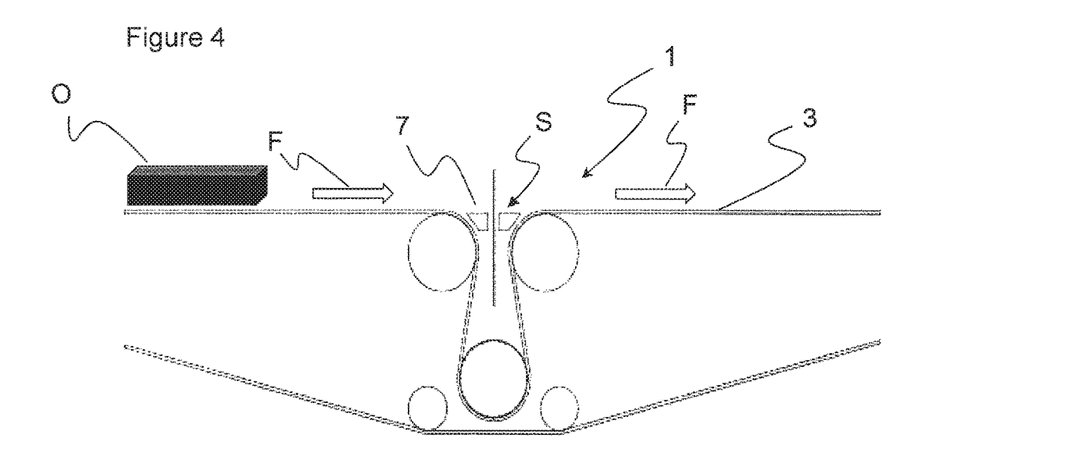
FIG. 4 a schematic detailed side view of the first preferred embodiment of the conveying apparatus in accordance with the invention.

FIG. 4 shows a schematic detailed side view of the first preferred embodiment of the conveying apparatus 1 in accordance with the invention in which a light-permeable conveyor element 7 is arranged in the at least one gap S between the deflected conveyor belt 3. The conveyor element 7 supports the object O on its transport over the at least one gap S so that the movement of the object O can be continuous, stable, and slip-free. The measurement of the object O is hereby precise and exact.

Figure 5:
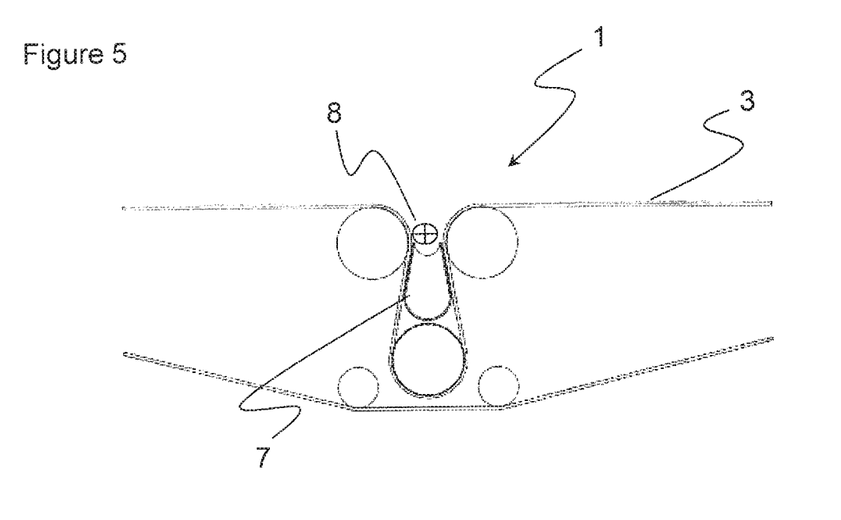
FIG. 5 a further schematic detailed side view of the first preferred embodiment of the conveying apparatus in accordance with the invention.

The conveyor element 7 is advantageously designed such that it collects contaminants from the conveyor belt 3 and disposes of them transversely to the main conveying direction F of the conveyor belt 3. In this respect, the conveyor element 7 can, as shown in FIG. 5, have the form of a rain gutter so that the contaminants can be collected simply and reliably from the conveyor belt 3. Compressed air that is directed along a longitudinal axis of the conveyor element 7 by means of a compressed air nozzle 8 can in a preferred manner provide the disposal of or the transporting away of the contaminants from the conveyor belt 3 in a very simple manner.

Figure 6:
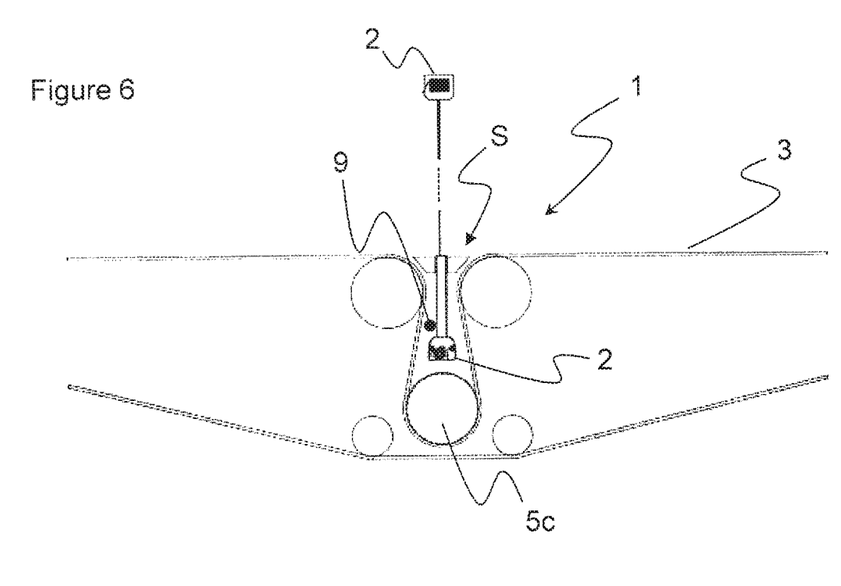
FIG. 6 a schematic detailed side view of a conveyor element of the first preferred embodiment of the conveying apparatus in accordance with the invention.

As shown in FIG. 6, a hollow space 9 is present between the at least one gap S and the third roller 5c by the arranged of the deflection device 5 and is bounded by the conveyor belt 3. In the event that the sensor 2, for example, comprises a light grid pair that comprises a light transmitter 2a separated from the light receiver 2b, the hollow space 9 has the advantage that the light receiver 2b or the light transmitter 2a, or vice versa, of the light grid pair is arranged in the hollow space 9. In the event that the sensor 2, for example, comprises a reflector and a light barrier comprising the light transmitter 2a and the light receiver 2b, the reflector or the light barrier, or vice versa, of the sensor 2 is arranged in the hollow space 9. The conveying apparatus 1 in accordance with the invention can hereby be of a more compact design.

Figure 7:
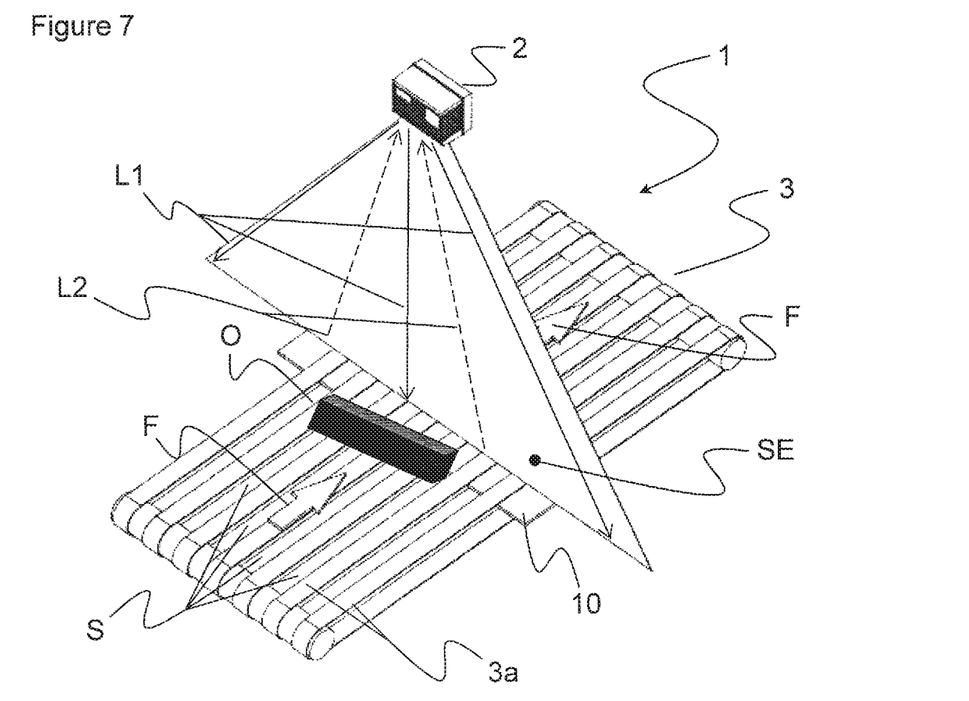
FIG. 7 a schematic 3D representation of a second preferred embodiment of the conveying apparatus in accordance with the invention.

In accordance with FIG. 7, a schematic 3D representation of a second preferred embodiment of the conveying apparatus 1 in accordance with the invention is shown. In comparison with the first preferred embodiment, the endless conveyor belt 3 in accordance with the invention does not comprise a single conveyor belt 3, but rather a plurality of bands 3a having a predefined spacing between the bands.

In this respect, the predefined spacing between the bands 3a defines the spacings S in accordance with the invention in the conveyor belt 3, through which spacings the light beams L1 can pass.

The first light beams L1 that are reflected at the bands 3a effect a noise band in the evaluation. The first light beams L1 that pass through the gaps S in accordance with the invention effect noise-free signals in the evaluation. These noise-free signals make it possible for the evaluation device of the conveying apparatus 1 in accordance with the invention to determine a zero line for the measurement of the object O. It is advantageously made possible to exactly determine a reference signal as a reference value for the zero line by a reference element 10 having a characteristic degree of reflection of the evaluation device.

If an object O is transported along the main conveying direction F past the sensor 2, a noise-free change of the signals of the zero line that reproduce the dimension of the object O results at the positions of the gaps S in accordance with the invention. Noise-free signals in which the dimension of the object O is included do not result at the positions of the bands. While taking account of the signals at the positions of the gaps S in accordance with the invention, the correct signals of the dimension of the object O can be calculated by an offsetting with the non-noise free signals.

This means that the noise band of the conveyor belt 3 cannot only be reduced by the gaps S in accordance with the invention in the endless bands 3a free of interruption, but the determination of the dimension of the object O can be carried out more exactly and the interference noise of the bands 3a can be filtered by taking the zero line into account.

REFERENCE NUMERAL LIST 1 conveying apparatus
2 sensor 2a light transmitter
2b light receiver
3 conveyor belt
3a band
4 drive unit
5 deflection device
5a, 5b, 5c first, second, third rollers
6 reference remission/reference marks
7 conveyor element
8 compressed air nozzle
9 hollow space
10 reference element
F conveying direction
L1 first light beams
L2 second light beams
O object
S at least one gap
SE scan plane

The invention claimed is:

1. A conveying apparatus for transporting and for measuring an object, the conveying apparatus comprising
a sensor having a light transmitter that is arranged at a conveyor belt and that transmits first light beams in the direction of the conveyor belt,
a light receiver that is arranged at the conveyor belt and that receives second light beams, and
an evaluation device for determining a dimension of the object by evaluating the received second light beams,
wherein the conveyor belt is an endless conveyor belt that is driven by at least one drive unit and that moves in a main conveying direction,
wherein at least one gap is provided in the endless conveyor belt free of interruption, through which at least one gap the first light beams pass, and wherein the first light beams forms a scan plane in this at least one gap transversely to the main conveying direction of the conveyor belt,
wherein at least one deflection device is provided that deflects the endless conveyor belt out of its main conveying direction free of interruption such that the at least one gap is formed transversely to the main conveying direction of the conveyor belt,
wherein the deflection device comprises at least three deflection rollers that are arranged in the form of a triangle with respect to one another and with one side of the triangle being in parallel with the main conveying direction of the conveyor belt,
wherein a first roller and a second roller are disposed opposite one another and are arranged forming the at least one gap between each other; and wherein a third roller is arranged, with respect to the first and second rollers, beneath the gap and beneath the first and second rollers,
wherein the third roller of the deflection device serves as a reference remission for the sensor,
and wherein reference marks are provided at the third roller that can be read by the sensor for a calibration of the conveying apparatus, for a teaching of parameters for a determining of a speed and/or of a direction of rotation of the conveyor belt or of conveyor belt elements.

2. The conveying apparatus in accordance with claim 1, wherein the first and second rollers are arranged on a lower side of the conveyor belt and the third roller is arranged on an oppositely disposed upper side of the conveyor belt.

3. The conveying apparatus in accordance with claim 1, wherein the reference marks are reflection marks.

4. The conveying apparatus in accordance with claim 1, wherein the deflection device is provided for tensioning the conveyor belt.

5. A conveying apparatus for transporting and for measuring an object, the conveying apparatus comprising
a sensor having a light transmitter that is arranged at a conveyor belt and that transmits first light beams in the direction of the conveyor belt,
a light receiver that is arranged at the conveyor belt and that receives second light beams, and
an evaluation device for determining a dimension of the object by evaluating the received second light beams,
wherein the conveyor belt is an endless conveyor belt that is driven by at least one drive unit and that moves in a main conveying direction,
wherein at least one gap is provided in the endless conveyor belt free of interruption through which at least one gap the first light beams pass, and wherein the first light beams forms a scan plane in this at least one gap transversely to the main conveying direction of the conveyor belt,
wherein a light-permeable conveyor element is arranged in the at least one gap between the deflected conveyor belt,
and wherein the light-permeable conveyor element is designed such that it collects contaminants from the conveyor belt and disposes of them transversely to the main conveying direction of the conveyor belt.

6. A conveying apparatus for transporting and for measuring an object, the conveying apparatus comprising
a sensor having a light transmitter that is arranged at a conveyor belt and that transmits first light beams in the direction of the conveyor belt,
a light receiver that is arranged at the conveyor belt and that receives second light beams, and
an evaluation device for determining a dimension of the object by evaluating the received second light beams,
wherein the conveyor belt is an endless conveyor belt that is driven by at least one drive unit and that moves in a main conveying direction,
wherein at least one gap is provided in the endless conveyor belt free of interruption, through which at least one gap the first light beams pass, and wherein the first light beams forms a scan plane in this at least one gap transversely to the main conveying direction of the conveyor belt,
wherein at least one deflection device is provided that deflects the endless conveyor belt out of its main conveying direction free of interruption such that the at least one gap is formed transversely to the main conveying direction of the conveyor belt,
wherein the deflection device comprises at least three deflection rollers that are arranged in the form of a triangle with respect to one another and with one side of the triangle being in parallel with the main conveying direction of the conveyor belt,
wherein a first roller and a second roller are disposed opposite one another and are arranged forming the at least one gap between each other; and wherein a third roller is arranged, with respect to the first and second rollers, beneath the gap and beneath the first and second rollers,
wherein a hollow space that is bounded by the conveyor belt is present between the at least one gap and the third roller, and wherein a reflector of a light barrier comprising the light transmitter and the light receiver or the light receiver or the light transmitter of a light grid pair is arranged in the hollow space.

7. A conveying apparatus for transporting and for measuring an object, the conveying apparatus comprising
a sensor having a light transmitter that is arranged at a conveyor belt and that transmits first light beams in the direction of the conveyor belt,
a light receiver that is arranged at the conveyor belt and that receives second light beams, and
an evaluation device for determining a dimension of the object by evaluating the received second light beams, wherein the conveyor belt is an endless conveyor belt that is driven by at least one drive unit and that moves in a main conveying direction,
and wherein at least one gap is provided in the endless conveyor belt free of interruption, through which at least one gap the first light beams pass, and wherein the first light beams forms a scan plane in this at least one gap transversely to the main conveying direction of the conveyor belt,
wherein the endless conveyor belt comprises a plurality of bands having a predefined spacing between the bands; and wherein the predefined spacing between the bands defines the gaps through which the first light beams pass.

8. The conveying apparatus in accordance with claim 7, wherein the evaluation device evaluates the second light beams at positions of the gaps between the bands and evaluates the second light beams at positions of the bands while taking account of the evaluation of the second light beams at the positions of the gaps.

* * * * *